US006957179B2

(12) United States Patent
Debling

(10) Patent No.: US 6,957,179 B2
(45) Date of Patent: Oct. 18, 2005

(54) ON-CHIP EMULATOR COMMUNICATION

(75) Inventor: Anthony Debling, Bristol (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 654 days.

(21) Appl. No.: 09/982,094

(22) Filed: Oct. 18, 2001

(65) Prior Publication Data
US 2002/0077802 A1 Jun. 20, 2002

(30) Foreign Application Priority Data
Oct. 18, 2000 (GB) .............................. 0025591

(51) Int. Cl.$^7$ ............................................ G06F 9/455
(52) U.S. Cl. ............................. 703/27; 703/24; 703/25; 703/27; 703/28; 714/28
(58) Field of Search .............................. 703/23, 24, 25, 703/27, 28; 714/27, 28, 29

(56) References Cited

U.S. PATENT DOCUMENTS

| | | | |
|---|---|---|---|
| 4,860,290 A | | 8/1989 | Daniels et al. |
| 5,173,904 A | | 12/1992 | Daniels et al. |
| 5,329,471 A | | 7/1994 | Swoboda et al. |
| 5,535,331 A | | 7/1996 | Swoboda et al. |
| 5,684,721 A | | 11/1997 | Swoboda et al. |
| 6,032,268 A | | 2/2000 | Swoboda et al. |
| 6,085,336 A | | 7/2000 | Swoboda et al. |
| 6,347,395 B1 | * | 2/2002 | Payne et al. .................. 716/18 |
| 6,643,803 B1 | * | 11/2003 | Swoboda et al. ............. 714/29 |
| 6,687,865 B1 | * | 2/2004 | Dervisoglu et al. ......... 714/726 |
| 6,725,391 B2 | * | 4/2004 | Swoboda ..................... 714/28 |
| 2001/0056555 A1 | * | 12/2001 | Deao et al. .................... 714/28 |
| 2002/0046016 A1 | * | 4/2002 | Debling ....................... 703/28 |
| 2002/0046399 A1 | * | 4/2002 | Debling ...................... 717/138 |
| 2002/0059541 A1 | * | 5/2002 | Swoboda ..................... 714/28 |
| 2002/0059542 A1 | * | 5/2002 | Debling ....................... 714/28 |

FOREIGN PATENT DOCUMENTS

| WO | WO 98 09208 A | 3/1998 |
|---|---|---|
| WO | WO 00 57587 A | 9/2000 |

* cited by examiner

Primary Examiner—W. Thomson
(74) Attorney, Agent, or Firm—Lisa K. Jorgenson; James H. Morris; Wolf, Greenfield & Sacks, P.C.

(57) ABSTRACT

There is disclosed a method of communicating with an integrated circuit chip having plural components thereon, the components including digital processing circuitry and an on-chip emulator connected to the digital processing circuitry for initiating command and control sequences for the digital processing circuitry in response to externally applied signals or in response to detected states of the digital processing circuitry. The method comprising of providing a universal serial bus having first and second ends, the first end being connected to the on-chip emulator; providing a computer device having a digital processor, a universal serial bus port connected to the second end of the universal serial bus, and a second port for connection to a communication channel; assigning at least one of the components with a respective address; sending a remote procedure call from the component over the universal serial bus to the computer device, the remote procedure call including data indicative of the address of the component; in response thereto, causing the computer device to generate a socket call over the communication channel thereby creating a first socket at the computer device and a second socket at a computer connected to the communication channel; in the computer device, receiving a response at the first socket; and sending information derived from the response over the universal serial bus to the component.

15 Claims, 2 Drawing Sheets

ON-CHIP EMULATOR COMMUNICATION

FIELD OF THE INVENTION

The present invention relates to a system and method for communicating with an embedded digital processor on a single integrated circuit chip, the chip comprising an on-chip emulation device.

BACKGROUND TO THE INVENTION

In a first debugging technique, a hardware emulator program is provided on the host computer which is performing the debugging. Such emulators however can only provide limited functionality, and are generally undesirable In a technique used by the Applicants for communicating with embedded digital processors, so-called "on-chip emulators" are used. The function of an on-chip emulator device is to monitor and control the operation of the digital signal processor. Such devices typically have storage capability, and are able to initiate command and control sequences for the digital processor in response to externally applied signals from a host computer or in response to detected states of the digital processor.

Communication between the on-chip emulation device and the host computer is carried out via a link, which is typically a link designed for that purpose. Typically, signals over the link are tailored to the particular on-chip emulation device in the interests of efficient debugging.

This however is an inflexible arrangement, and is typically limited to use during "pure" debugging—i.e. pre-production debugging. It would not be suitable for production use, or where the need arises for communication with an embedded system while it is in service—eg to update data or programs stored on the embedded system.

SUMMARY OF THE INVENTION

It is an object of the present invention to provide a system and method capable of improved communication with an integrated circuit chip containing an embedded digital processor According to a first aspect of the present invention there is provided a method of communicating with an integrated circuit chip having plural components thereon, said components including digital processing circuitry and an on-chip emulator connected to said digital processing circuitry for initiating command and control sequences for the digital processing circuitry in response to externally applied signals or in response to detected states of the digital processing circuitry, the method comprising:

providing a universal serial bus having first and second ends, said first end being connected to said on-chip emulator;

providing a computer device having a digital processor, a universal serial bus port connected to said second end of said universal serial bus, and a second port for connection to a communication channel;

assigning at least one of said components with a respective address;

sending a remote procedure call from component over said universal serial bus to said computer device;

in response thereto, causing said computer device to generate a socket call over said communication channel thereby creating a first socket at said computer device and a second socket at a computer connected to said communication channel;

in said computer device, receiving a response at said first socket; and sending information derived from said response to said component.

According to a second aspect of the invention there is provided a method of communicating with an integrated circuit chip having plural components thereon, said components including digital processing circuitry and an on-chip emulator connected to said digital processing circuitry for initiating command and control sequences for the digital processing circuitry in response to externally applied signals or in response to detected states of the digital processing circuitry, the method comprising:

providing a universal serial bus having first and second ends, said first end being connected to said on-chip emulator;

providing a computer device having a digital processor, a universal serial bus port connected to said second end of said universal serial bus, and a second port for connection to a communication channel;

assigning plural of said components with a respective address;

sending a remote procedure call from one of said plural components over said universal serial bus to said computer device, including data indicative of another of said plural components;

in response thereto, causing said computer device to generate a socket call over said communication channel thereby creating a first socket at said computer device and a second socket at a computer connected to said communication channel;

in said computer device, receiving a response at said first socket; and sending information derived from said response to said another component.

Preferably the method further comprises implementing a proxy server process in said computer device, wherein said proxy server process implements said causing and sending steps.

Advantageously said communication channel comprises an Ethernet link.

Conveniently said communication channel comprises a telephone link.

According to another aspect of the invention there is provided a system for communicating with an integrated circuit chip having plural components thereon, said components including digital processing circuitry and an on-chip emulator connected to said digital processing circuitry for initiating command and control sequences for the digital processing circuitry in response to externally applied signals or in response to detected states of the digital processing circuitry, the system comprising:

universal serial bus having first and second ends, said first end being connected to said on-chip emulator;

a computer device having a digital processor, a universal serial bus port being connected to said second end of said universal serial bus, and a second port for connection to a communication channel;

generating circuitry associated with said component for sending a remote procedure call from said component over said universal serial bus to said computer device, wherein said remote procedure call comprises data indicative of said component;

conversion circuitry in said computer device for generating a socket call over said communication channel in response to a received remote procedure call thereby creating a first socket at said computer device and a second socket at a computer connected to said communication channel;

receiving circuitry in said computer device for receiving a response at said first socket; and sending circuitry for sending information derived from said response over said universal serial bus to said component.

According to a further aspect of the invention there is provided a system for communicating with an integrated circuit chip having plural components thereon, said components including digital processing circuitry and an on-chip emulator connected to said digital processing circuitry for initiating command and control sequences for the digital processing circuitry in response to externally applied signals or in response to detected states of the digital processing circuitry, the system comprising:

a universal serial bus having first and second ends, said first end being connected to said on-chip emulator;

a computer device having a digital processor, a universal serial bus port connected to said second end of said universal serial bus, and a second port for connection to a communication channel;

generating circuitry for sending a remote procedure call from one of said plural components over said universal serial bus to said computer device, including data indicative of another of said plural components;

conversion circuitry in said computer device for generating a socket call over said communication channel in response to a received remote procedure call thereby creating a first socket at said commuter device and a second socket at a computer connected to said communication channel;

receiving circuitry in said computer device for receiving a response at said first socket; and sending circuitry in said computer device for sending information derived from said response to said another component via said universal serial bus.

Preferably said computer device comprises an interface device having a universal serial bus port and an Ethernet port for connection to a computer network, whereby said communication channel comprises said computer network.

Advantageously said communication channel comprises a telephone link

Conveniently said communication channel comprises the Internet.

BRIEF DESCRIPTION OF THE DRAWINGS

An exemplary embodiment of the invention will now be described with reference to the accompanying drawings in which.

In the various figures, like reference numerals indicate like parts.

DESCRIPTION OF PREFERRED EMBODIMENTS

Figure 1:
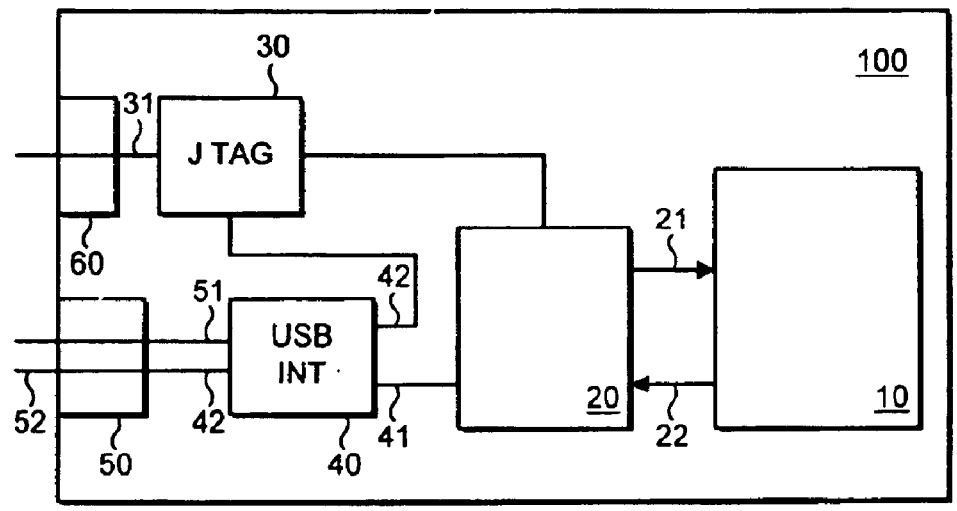
FIG. 1 shows a schematic diagram of an integrated circuit chip having an on-chip emulator device and a USB interface.

Referring first to FIG. 1, an embedded system includes an integrated circuit chip 100 which comprises a processor 10 on said chip. As used herein, the term 'processor' includes microprocessors and digital signal processors. The processor is connected to other component circuitry of said embedded system in a manner known to those skilled in the art.

It may be advantageous to be able to collect information about the operation of the processor and also to supply control and command information to said processor, both in response to conditions on the processor itself, and also in response to information conveyed from a host computer. Such a situation may be used not only during debugging, but also may allow updating of program data, and configuration of intelligent peripherals.

For collecting information about operation of the processor and for controlling the processor, the chip 100 includes an on-chip emulator having storage and processing circuitry for that purpose Such an on-chip emulator 20 is shown schematically on FIG. 1 as having a control path 21 connected to the processor 10 and having an information-collecting path 22 from the digital processor 10.

The on-chip emulator 20 has associated JTAG circuitry 30 connected to it.

To enable ready connection to a host device, the chip further comprises a universal serial bus (USB) interface circuit 40. The USB interface 40 has a first port 41 connected to the on-chip emulator 20, a second port 42 connected on-chip to a USB port 50 via a universal serial bus 51. The USB interface circuitry also has a further port 42 connected to the JTAG circuitry 30 which in turn has an on-chip connection 31 to a JTAG port 60.

A universal serial bus is, in use, connected to the USB port 50. For debug purposes, the universal serial bus 52 connects at its other end to a host device having a USB port.

Debugging may take place using the host device itself; however by virtue of the USB connection, it may be possible to debug from a more remote location, as will be later described herein.

Figure 2:
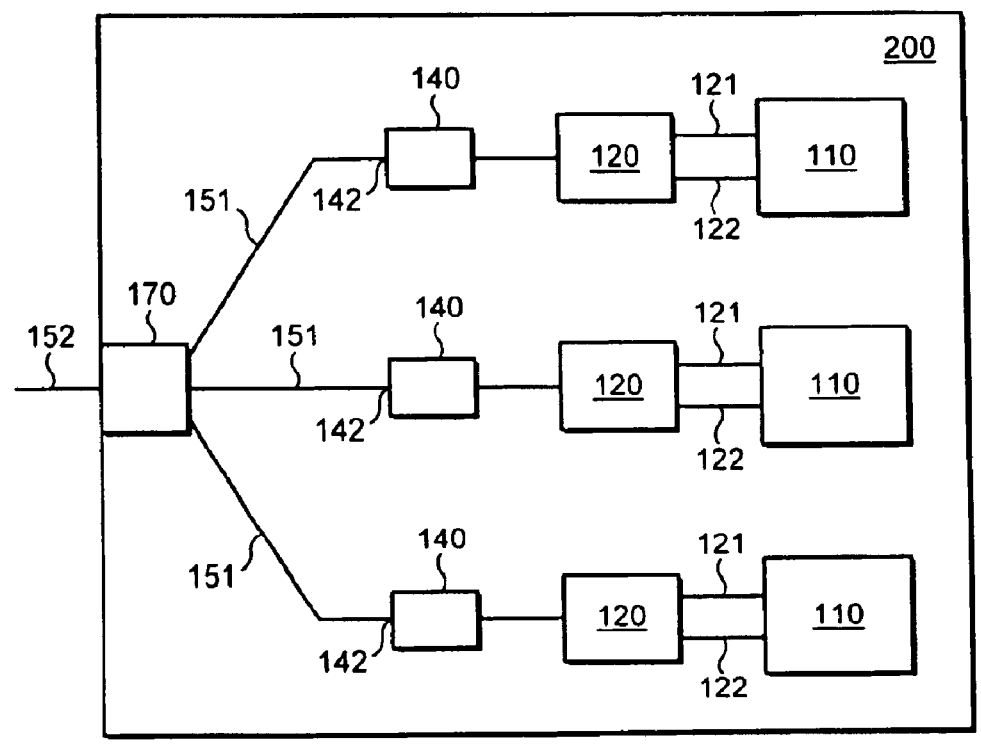
FIG. 2 shows a multiprocessor version of the chip of FIG. 1.

Referring now to FIG. 2, a second integrated circuit chip 200 comprises plural—here 3—embedded processors 110, each having a respective associated on-chip emulator 120 connected to it via a respective control path 121 and information collecting path 122. Each on-chip emulator 120 is connected to respective USB interface circuitry 140 and each USB interface circuitry 140 has a USB input port 142 to which is connected an on-chip universal serial bus 151 which connects to a USB hub 170. JTAG circuitry as shown in FIG. 1 is also provided but is not shown for the sake of clarity.

The USB hub 170 has an input for a universal serial bus 152, for off chip communication.

Figure 3:
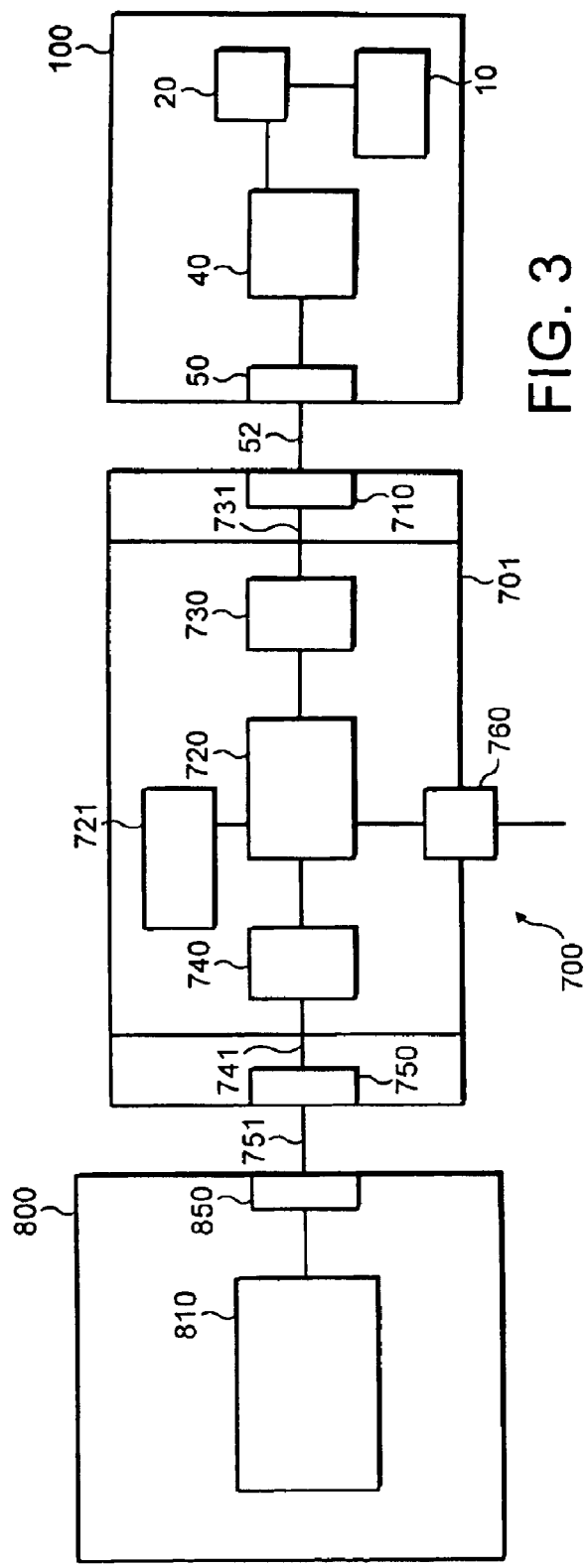
FIG. 3 shows a partial block schematic diagram of a communication system in accordance with the present invention.

Referring to FIG. 3 an embodiment of the present invention will now be described.

A target device 100, as described with respect to FIG. 1, is connected via a communication device 700 to a host computer system 800. The communication device 800 has an Ethernet port 750, a universal serial bus port 710 and an integrated circuit chip 701 having on-chip processing circuitry 720, on-chip memory circuitry 721, an on-chip Ethernet interface 740 and an on-chip universal serial bus interface 730. The on-chip Ethernet interface is connected to said Ethernet port via wiring 741, and the universal serial bus interface is connected to the universal serial bus port via wiring 731. The Ethernet port 750 connects to the host via a link 751. It will be understood that the link 751 may be a direct link or a network connection, or any other functionally transparent link. Thus the host could be remote and connected via a Local Area Network, or other network, and the Ethernet port be local and coupled to the network Connections located on the chip link the interfaces to the processing circuitry so that data incoming to the Ethernet port 750 are translated from the Ethernet protocol to the form required by the processing circuitry 720. Any data to be sent to the target device is output by the processing circuitry 720 to the universal serial bus interface and there translated to the universal serial bus protocol and transferred via the universal serial bus 52 to the target.

In use the on-chip processing circuitry 720 operates using embedded web server processes and the communication device forms an intelligent networked device. The consequence is that it is possible to move certain selected processes from the host onto the on-chip processing circuitry 720. Typically processes suitable for implementation on the on-chip processing circuitry include those that need frequent interaction with the target.

Continued reference to FIG. 3 shows that the communication device 700 has a further port 760, for connection to a telephone line. To provide data of the right form for signalling over a telephone line, the processing circuitry 720 may form a soft modem or alternatively an on-chip hard modem may be provided, as known to those skilled in the art.

Use of the telephone line port 760 enables connection to the Internet if so required, where suitable software exists in the communications device.

Alternatively, users can connect their target systems for remote evaluation by, for example, the manufacturer. Yet another alternative is to provide the facility to upgrade or otherwise modify the contents of stored information in the target.

What is claimed is:

1. A method of communicating with an integrated circuit chip having plural components thereon, said components including digital processing circuitry and an on-chip emulator connected to said digital processing circuitry for initiating command and control sequences for the digital processing circuitry in response to externally applied signals or in response to detected states of the digital processing circuitry, the method comprising:

providing universal serial bus having first and second ends, said first end being connected to said on-chip emulator;

providing a computer device having a digital processor, a universal serial bus port connected to said second end of said universal serial bus, and a second port for connection to a communication channel;

assigning at least one of said components with a respective address;

sending a remote procedure call from said component over said universal serial bus to said computer device, said remote procedure call including data indicative of the address of said component;

in response thereto, causing said computer device to generate a socket call over said communication channel thereby creating a first socket at said computer device and a second socket at a computer connected to said communication channel;

in said computer device, receiving a response at said first socket; and sending information derived from said response over said universal serial bus to said component.

2. A method of communicating with an integrated circuit chip having plural components thereon, said components including digital processing circuitry and an on-chip emulator connected to said digital processing circuitry for initiating command and control sequences for the digital processing circuitry in response to externally applied signals or in response to detected states of the digital processing circuitry, the method comprising:

providing a universal serial bus having first and second ends, said first end being connected to said on-chip emulator;

providing a computer device having a digital processor, a universal serial bus port connected to said second end of said universal serial bus, and a second port for connection to a communication channel;

assigning plural of said components with a respective address;

sending a remote procedure call from one of said plural components over said universal serial bus to said computer device, said remote procedure call including data indicative of another of said plural components;

in response thereto, causing said computer device to generate a socket call over said communication channel thereby creating a first socket at said computer device and a second socket at a computer connected to said communication channel;

in said computer device, receiving a response at said first socket; and sending information derived from said response over said universal serial bus to said another component.

3. The method of claim 2 further comprising implementing a proxy server process in said computer device, wherein said proxy server process implements said causing and sending steps.

4. The method of claim 2 wherein said communication channel comprises an Ethernet link.

5. The method of claim 2 wherein said communication channel comprises a telephone link.

6. A system for communicating with an integrated circuit chip having plural components thereon, said components including digital processing circuitry and an on-chip emulator connected to said digital processing circuitry for initiating command and control sequences for the digital processing circuitry in response to externally applied signals or in response to detected states of the digital processing circuitry, the system comprising:

a universal serial bus having first and second ends, said first end being connected to said on-chip emulator;

a computer device having a digital processor, a universal serial bus port being connected to said second end of said universal serial bus, and a second port for connection to a communication channel;

generating circuitry associated with said component for sending a remote procedure call from said component over said universal serial bus to said computer device, wherein said remote procedure call comprises data indicative of said component;

conversion circuitry in said computer device for generating a socket call over said communication channel in response to a received remote procedure call thereby creating a first socket at said computer device and a second socket at a computer connected to said communication channel;

receiving circuitry in said computer device for receiving a response at said first socket; and sending circuitry for sending information derived from said response over said universal serial bus to said component.

7. A system for communicating with an integrated circuit chip having plural components thereon, said components including digital processing circuitry and an on-chip emulator connected to said digital processing circuitry for initiating command and control sequences for the digital processing circuitry in response to externally applied signals or in response to detected states of the digital processing circuitry, the system comprising:

a universal serial bus having first and second ends, said first end being connected to said on-chip emulator;

a computer device having a digital processor, a universal serial bus port connected to said second end of said universal serial bus, and a second port for connection to a communication channel;

generating circuitry for sending a remote procedure call from one of said plural components over said universal serial bus to said computer device, including data indicative of another of said plural components;

conversion circuitry in said computer device for generating a socket call over said communication channel in response to a received remote procedure call thereby creating a first socket at said computer device and a second socket at a computer connected to said communication channel;

receiving circuitry in said computer device for receiving a response at said first socket; and sending circuitry in said computer device for sending information derived from said response to said another component via said universal serial bus.

8. The system of claim 7 wherein said computer device comprises an interface device having a universal serial bus port and an Ethernet port for connection to a computer network, whereby said communication channel comprises said computer network.

9. The system of 7 wherein said communication channel comprises a telephone link.

10. The system of claim 7 wherein said communication channel comprises the Internet.

11. A method of communicating with an integrated circuit chip having plural components thereon, said components including digital processing circuitry and an on-chip emulator connected to said digital processing circuitry for initiating command and control sequences for the digital processing circuitry in response to externally applied signals or in response to detected states of the digital processing circuitry, the method comprising:

assigning at least one of said components with a respective address;

sending a remote procedure call from said components over a universal serial bus to a computer service, said remote procedure call including data indicative of the address of said component;

in response thereto, causing said computer device to generate a socket call over a communication channel thereby creating a first socket at said computer device and a second socket at a computer connected to said communication channel;

in said computer device, receiving a response at said first socket; and sending information derived from said response over said univesal serial bus to said component.

12. A method of communicating with an integrated circuit chip having plural components thereon, said components including digital processing circuitry and an on-chip emulator connected to sad digital processing circuitry for initiating command and control sequences for the digital processing circuitry in response to externally applied signals or in response to detected states of the digital processing circuitry, the method comprising:

assigning plural of said components with a respective address;

sending a remote procedure call from one of said plural components over a universal serial bus to a computer device, said remote procedure call including data indicative of another of said plural components;

in response thereto, causing said computer device to generate a socket call over a communication channel thereby creating a first socket at said computer device and a second socket at a computer connected to said communication channel;

in said computer device, receiving a response at said first socket; and sending information derived from said response over said universal serial bus to said another component.

13. The method of claim 12 further comprising implementing a proxy server process in said computer device, wherein said proxy server process implements said causing and sending steps.

14. The method of claim 12 wherein said communication channel comprises an Ethernet link.

15. The method of claim 12 wherein said communication channel comprises a telephone link.

\* \* \* \* \*

UNITED STATES PATENT AND TRADEMARK OFFICE
CERTIFICATE OF CORRECTION

PATENT NO. : 6,957,179 B2
DATED : October 18, 2005
INVENTOR(S) : Anthony Debling It is certified that error appears in the above-identified patent and that said Letters Patent is hereby corrected as shown below:

Column 8,
Line 1, should read:
-- sending a remote procedure call from said component --.
Line 2, should read:
-- over a universal serial bus to a computer device, said --.
Line 14, should read:
-- universal serial bus to said component. --.
Line 18, should read:
-- lator connected to said digital processing circuitry for initi --.

Signed and Sealed this

Third Day of January, 2006

JON W. DUDAS
*Director of the United States Patent and Trademark Office*